(12) United States Patent
Boren

(10) Patent No.: US 7,562,844 B2
(45) Date of Patent: Jul. 21, 2009

(54) MULTIPLE ATTENDANT GALLEY

(75) Inventor: Kelly L. Boren, Arlington, WA (US)

(73) Assignee: The Boeing Company, Chicago, IL (US)

( * ) Notice: Subject to any disclaimer, the term of this patent is extended or adjusted under 35 U.S.C. 154(b) by 2 days.

(21) Appl. No.: 11/160,958

(22) Filed: Jul. 18, 2005

(65) Prior Publication Data

US 2007/0018046 A1    Jan. 25, 2007

(51) Int. Cl.
B64D 11/04    (2006.01)

(52) U.S. Cl. .................... 244/118.5; 244/117 R

(58) Field of Classification Search .............. 244/118.1, 244/117 R, 118.2, 118.5, 118.6; D12/345
See application file for complete search history.

(56) References Cited

U.S. PATENT DOCUMENTS

| | | | | |
|---|---|---|---|---|
| 3,517,899 A * | 6/1970 | Vernon | ................. | 186/40 |
| 4,022,404 A * | 5/1977 | Greiss | ................. | 244/118.5 |
| 4,055,317 A * | 10/1977 | Greiss | ................. | 244/118.5 |
| RE32,176 E * | 6/1986 | Vernon | ................. | 244/118.5 |
| 5,074,496 A * | 12/1991 | Rezag et al. | ................. | 244/118.1 |
| 5,083,727 A * | 1/1992 | Pompei et al. | ................. | 244/118.6 |
| 5,322,244 A * | 6/1994 | Dallmann et al. | ................. | 244/118.5 |
| 5,474,260 A * | 12/1995 | Schwertfeger et al. | ................. | 244/118.5 |
| 6,003,813 A * | 12/1999 | Wentland et al. | ................. | 244/118.5 |
| 6,059,229 A * | 5/2000 | Luria | ................. | 244/118.1 |
| 6,152,400 A * | 11/2000 | Sankrithi et al. | ................. | 244/118.5 |
| 6,189,831 B1 * | 2/2001 | Asai et al. | ................. | 244/118.5 |
| 6,305,643 B1 * | 10/2001 | Sankrithi | ................. | 244/118.1 |
| 6,340,136 B1 * | 1/2002 | Luria | ................. | 244/118.1 |
| D455,391 S | 4/2002 | Granzeier et al. | | |
| 6,464,169 B1 * | 10/2002 | Johnson et al. | ................. | 244/118.5 |
| D479,183 S | 9/2003 | Roseman | | |
| 6,616,098 B2 * | 9/2003 | Mills | ................. | 244/118.5 |
| 6,663,043 B1 * | 12/2003 | Luria | ................. | 244/118.1 |
| 6,761,332 B1 * | 7/2004 | Bengtsson | ................. | 244/118.5 |
| 6,766,983 B2 * | 7/2004 | D'Alvia | ................. | 244/118.5 |
| D510,816 S | 10/2005 | Lee | | |
| 7,080,806 B2 * | 7/2006 | Mills | ................. | 244/118.1 |
| 2003/0029967 A1 * | 2/2003 | Mills | ................. | 244/118.5 |
| 2003/0062449 A1 * | 4/2003 | Sankrithi | ................. | 244/118.6 |
| 2003/0141413 A1 * | 7/2003 | Brasseur et al. | ................. | 244/118.5 |
| 2003/0189132 A1 * | 10/2003 | Brady et al. | ................. | 244/118.5 |
| 2004/0251384 A1 * | 12/2004 | Sprenger | ................. | 244/118.5 |
| 2005/0224646 A1 * | 10/2005 | MIlls | ................. | 244/118.5 |
| 2006/0054741 A1 * | 3/2006 | Mills et al. | ................. | 244/118.5 |

* cited by examiner

*Primary Examiner*—Michael Carone
*Assistant Examiner*—Benjamin P Lee
(74) *Attorney, Agent, or Firm*—Yee & Associates, P.C.; James M. Poole

(57) ABSTRACT

A service galley at the rear of an aircraft that has a generally U-shaped configuration of multiple cart storage compartments. The rear galley also includes an island of cart storage compartments. The island may be attached to the floor of the aircraft or to a bulkhead. Mobile service carts are stored within the storage compartments.

26 Claims, 2 Drawing Sheets

MULTIPLE ATTENDANT GALLEY

TECHNICAL FIELD

The present invention relates generally to aircraft galleys, and more particularly to galleys with improved storage capacity and enlarged work areas.

BACKGROUND OF THE INVENTION

It is known to have galleys in airplanes, including those positioned at the rear (or "aft") of an airplane. Galleys serve multiple purposes. One purpose is to store mobile service carts that contain food, beverages and other supplies for passengers on the aircraft. The galley also serves as a preparation and work area for the attendants working on the aircraft in order to prepare food or beverages for the passengers.

The number of galleys and mobile service carts varies for different aircraft and are generally related to the size of the aircraft and the number of passenger seats. Small aircraft often have only one galley and 1-2 mobile service carts. Large "jumbo" aircraft with several hundred seats (e.g. 350-400 plus passengers) can have up to 3-4 galleys and may utilize over 20 mobile service carts. For middle market aircraft holding 190-300 passengers, typically three galleys are provided. One of the three galleys is positioned in the forward area of the aircraft (to serve first class passengers), one is positioned in the middle portion of the aircraft and one is positioned in the aft section of the aircraft. All of the galleys, particularly those in the small and mid-market aircraft, are typically small in size creating cramped working conditions for the attendants. One of the primary reasons that the galleys are small is to maximize the number of passenger seats on the aircraft, and hence maximize revenue for the airline.

In a typical aft galley of an aircraft, two parallel straight rows of cart storage compartments are provided. The two rows of storage compartments define a center aisle that dead-ends at the rear wall of the aircraft. There is room for only two attendants to work comfortably within the aisle. Typically, one attendant will work on each side of the aisle. Mobile service carts are removed from the storage compartments when it is time to serve the passengers.

There is a need for a more efficient and convenient layout of the storage compartments for the mobile service carts, particularly in mid-market aircraft. Also, it would be advantageous if the galleys allowed more than two attendants to work comfortably within the space and provided a more efficient arrangement for maneuvering the carts into and out of the storage compartments without inconveniencing the other attendants. Further, it would be advantageous to reduce or consolidate the number of galleys on an aircraft, which would allow for more seating for passengers in the aircraft.

Further, it is desirable to possibly have the aft galley of an aircraft serve as a common area for passengers to congregate, converse and/or relax.

It is an object of the present invention to provide an improved galley for a passenger aircraft, particularly for a mid-market aircraft. It is another object of the present invention to reduce the number of galleys on an aircraft and thus to provide more floor space for passenger seating.

It is a further object of the present invention to provide an improved galley for a passenger aircraft, which has increased capacity for the storage of mobile service carts. It is still another object of the present invention to provide an improved galley for a passenger aircraft, particularly for mid-market aircraft, which has a larger workspace for attendants.

These and other objects of the present invention are met by the present invention as set forth herein, as shown in the attached drawings and as claimed in the appended claims.

SUMMARY OF THE INVENTION

The galley of the present invention includes multiple cart storage compartments for storage of mobile service carts wherein the storage compartments are arranged in a U-shaped configuration at the rear of the aircraft. The storage compartments are positioned beneath a U-shaped countertop surface.

The new aft galley overcomes the disadvantages of known galleys, particularly in mid-market aircraft, by providing more storage compartments at the rear of the aircraft, thus eliminating another galley of storage compartments within the aircraft and consolidating the compartments. For example, in passenger aircraft with three galleys, the present invention allows the second galley to be moved to and consolidated with the aft galley, thus providing more floor space for additional passenger seating. Each additional seat translates into increased revenue.

Another advantage of the galley of the present invention is that more than two attendants can be comfortably and efficiently accommodated in the workspace. The addition of more storage cart compartments also provides more countertop space.

Yet another advantage of the galley of the present invention is that it provides passengers with an in-flight destination. The galley provides an area where passengers can congregate, relax and more easily converse. In addition, the attendants in the new galley structure could sell snacks and beverages.

BRIEF DESCRIPTION OF THE DRAWINGS

The present invention will be described by way of example with reference to the following drawings.

DETAILED DESCRIPTION OF THE PREFERRED EMBODIMENT

Figure 1:
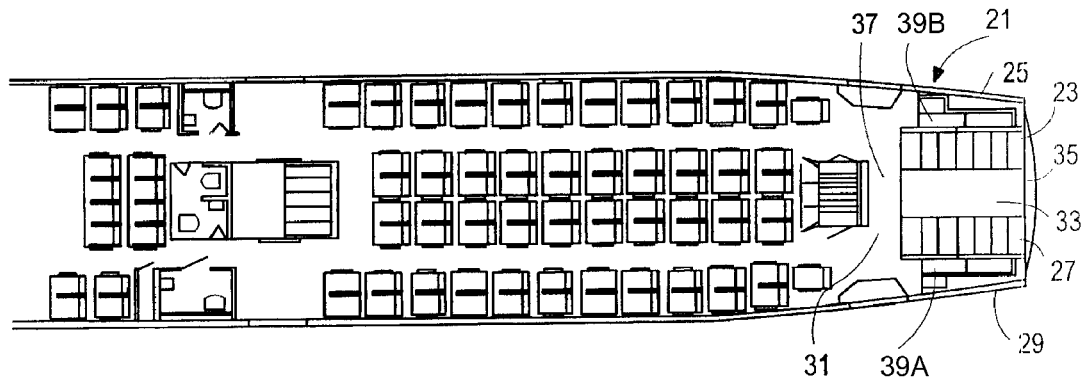
FIG. 1 illustrates a top view of a known galley at the rear of an aircraft.

FIG. 1 illustrates a known aft galley in an aircraft, shown generally at 21. There is a first row of storage compartments 23 that is positioned against a first interior wall 25 and second row 27 of storage compartments positioned against a second interior wall 29. The first and second rows of compartments 23, 27 are positioned parallel to each other and define a T-shaped or in-line work zone 31. A pair of countertops (not shown) is typically positioned on top of the two rows of compartments.

A first aisle 33 is defined by the first and second rows of storage compartments 23, 27, which runs parallel to the length of the aircraft and dead-ends at the rear interior wall 35 of the aircraft. Situated at the opposite end of the first aisle from the rear wall 35 is a second aisle 37 that is perpendicular to the first aisle 33 and runs across the width of the aircraft. It is known to have two mobile storage cart compartments 39A, 39B positioned in the second aisle 37, and one at each end. The aisle 33 provides a preparation work area for only two attendants. The mobile service carts stored within the storage compartments are removed by pulling them out into the aisle.

In accordance with this invention, "mid-market aircraft" refers to aircraft with a seating capacity generally in the range of 190-300+passengers. Airplanes with a smaller seating capacity are referred to as "small aircraft" and airplanes with a larger seating capacity (i.e. 350 passengers or more) are referred to as "jumbo" aircraft.

Figure 2:
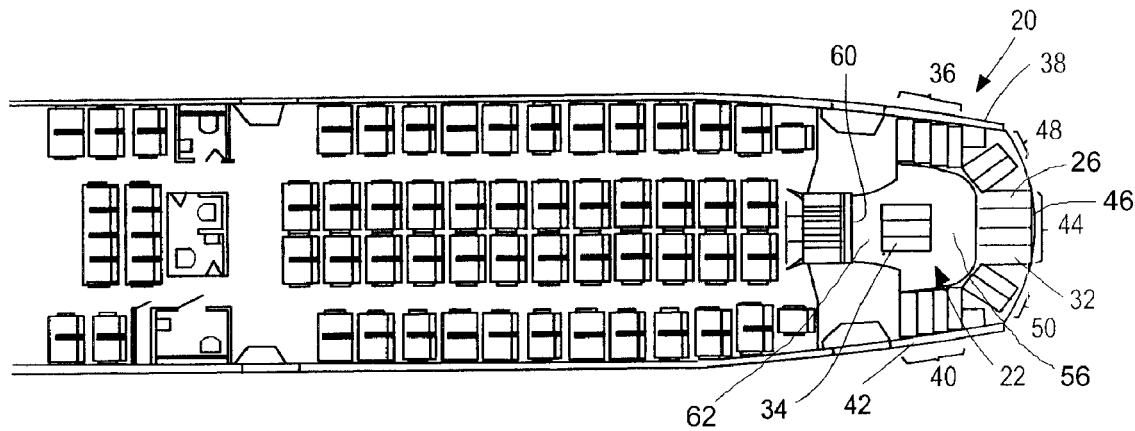
FIG. 2 illustrates a top view of a first embodiment of the present invention, with FIG. 2A being an enlarged view of a portion thereof.

FIG. 2 illustrates an aircraft, shown generally at 20, including one embodiment of a galley in accordance with the present invention, shown generally at 22. The rear galley 22, also known at the aft galley, is typically used on a mid-market aircraft 20 having a seating capacity of about 190 or more passengers.

Figure 4:
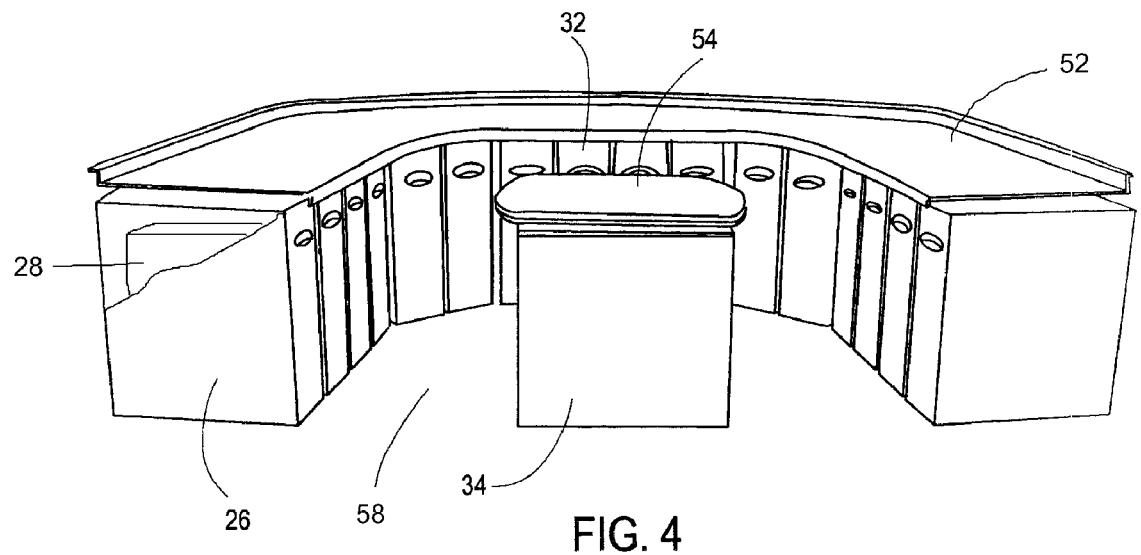
FIG. 4 illustrates a perspective view of the first embodiment of the present invention.

The galley 22 of the present invention is significantly larger in floor area than known aft galley areas, particularly for mid-market aircraft. The increase in floor space at the rear of the aircraft allows moving some storage compartments 26 from other areas to the rear of the aircraft and arranging the compartments 26 in a U-shaped configuration 32. The galley 22 also includes multiple mobile service carts 28 wherein the carts 28 are stored within the compartments 26, as illustrated in FIG. 4, wherein one of the storage compartments 26 is cut partially open showing one of the mobile service carts 28 stored therein. Preferably, there is one mobile service cart 28 for each storage compartment 26, although the storage compartments could be enlarged to store more than one cart in each compartment.

The present invention discloses an aircraft 20 having only two galleys of cart storage compartments. There is a first galley 30 (not shown) positioned at the front of the aircraft 20 (adjacent the first class compartment) and a second galley 22 positioned at the rear of the aircraft 20.

The second or aft galley 22 also includes an island 34 that has multiple cart storage compartments. The island 34 also includes multiple mobile service carts 28 positioned in storage compartment 26.

More specifically, the U-shaped galley configuration 32 includes five sets of cart storage compartments. A first set 36 of cart storage compartments are positioned adjacent to a first interior sidewall 38 of the aircraft 20. Similarly, a second set 40 of cart storage compartments is positioned adjacent to a second interior sidewall 42 of the aircraft. Positioned adjacent to the back interior wall 46 of the aircraft is a third set 44 of cart storage compartments. A fourth set 48 of cart storage compartments is positioned on an angle between the first and third sets 36, 44 of cart storage compartments. Similarly, a fifth set 50 of cart storage compartments is positioned on an angle between the second and third sets 40, 44 of cart storage compartments. The island 34 is defined by a sixth set of cart storage compartments. This sixth set 34 of compartments is positioned between the first and second sets 36, 40 of cart storage compartments.

A U-shaped first countertop member 52 (shown in FIG. 4 only, thus keeping FIGS. 1-3 simple) is positioned on top of the U-shaped cart storage arrangement 32. The first countertop member 52 covers the first 36, second 40, third 44, fourth 48 and fifth 50 sets of cart storage compartments. The island 34 of storage compartments includes a second countertop member 54 (shown in FIG. 4 only, thus keeping FIGS. 1-3 simple). The shape of the second countertop member 54 includes, but is not limited to, a rectangular or a circular configuration. Described another way, the sixth set 34 of cart storage compartments is covered by the second countertop member 54.

Figure 2A:
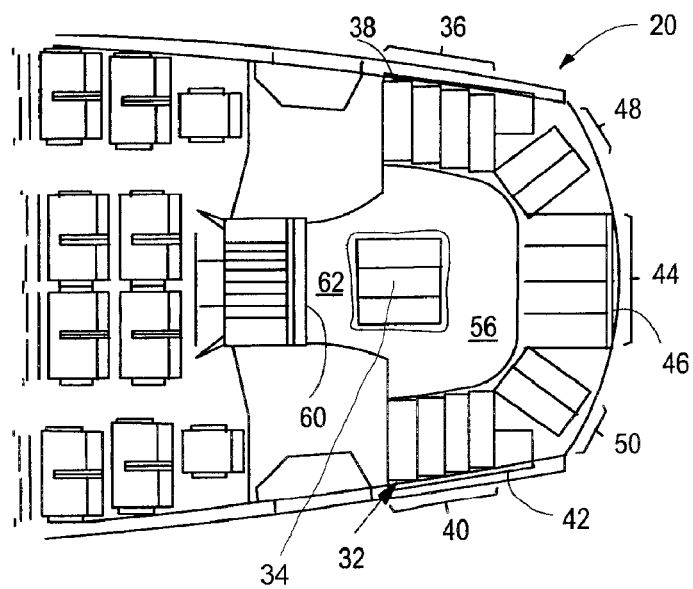

With respect to the U-shaped arrangement 32, 14-18 storage compartments are provided. In addition, 2-4 storage compartments are included within the island 34. Specifically referring to the embodiments illustrated in FIGS. 2, 2A and 3 there are four storage compartments in the first set 36 of compartments, four compartments in the second set 40, four compartments in the third set 44, two compartments in the fourth set 48, two compartments in the fifth set 50 and three compartments in the sixth set 34. In one embodiment, the specific layout of cart storage compartments for the entire aircraft includes at least two storage compartments in a first or front galley and nineteen storage compartments in the second or rear galley 22. This provides a total of at least twenty-one storage compartments 26 and mobile service carts 28 for the aircraft 20.

There is a U-shaped pathway 56 that is defined between the U-shaped configuration 32 of storage compartments and the island 34. The U-shaped pathway 56 contributes significantly to the increased efficiency of the space by providing a working area for more than two attendants at one time. In fact, up to five attendants could comfortably work in the area 56 at the same time.

The pathway area 56 (either alone or in combination with pathway 62 if provided), also provides a relaxation and conversation area for passengers during the flight. Passengers can move to the rear of the aircraft and congregate around the island 34. It is also possible for beverages, meals and snacks to be sold by the airline in the U-shaped aft galley. The size and configuration of the galley will amply allow one or more attendants to service passengers in the area 56 and around the island.

In the first embodiment, illustrated in FIG. 2, the island 34 stands by itself and is floating. Described another way, the island 34 is not adjacent to any wall. In this embodiment, the island 34 could be permanently attached to the floor of the aircraft or it could be removably attached to the floor.

If the island 34 is permanently attached to the floor 58 (shown in FIG. 4 only, thus keeping FIGS. 1-3 simple), it could be bolted down. However, if it is removably attached it can be moved to a different location at different times during the flight. For instance, during taxi, takeoff and landing the island 34 could be moved and positioned adjacent to the bulkhead 60. The bulkhead 60 is an upright partition that divides the seating area where passengers are seated from the aft galley 22. In fact, the floating island 34 could be temporarily attached to the bulkhead 60 and otherwise be unattached from the bulkhead 60. Described another way, the removably attached island 34 of storage compartments is capable of moving between a first position that is fixed against the bulkhead and second position where it is removed from the bulkhead. In this embodiment, the island 34 could stay in a desired position with the known or existing brake located on the cart's wheels.

When the floating island is not positioned adjacent to any wall, a second pathway 62 is defined between the island and a bulkhead of the aircraft, as illustrated in FIG. 2. The second pathway 62 further contributes to the efficiency of the workspace by providing an additional area to accommodate attendants or passengers.

Figure 3:
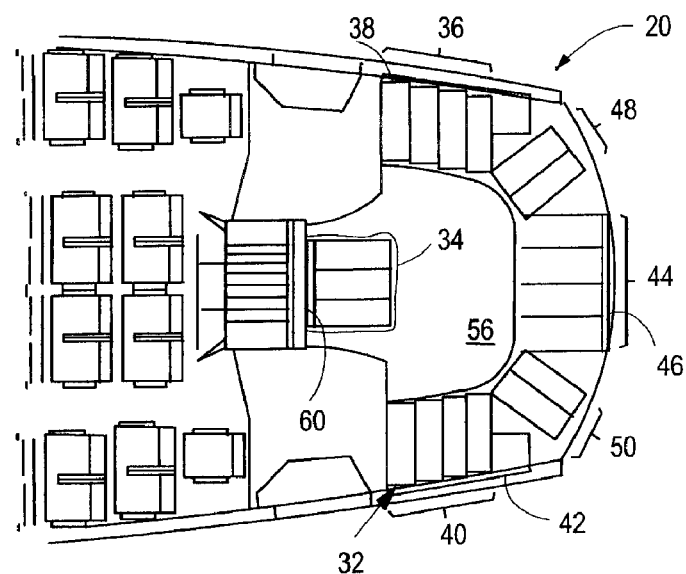
FIG. 3 illustrates a top view of a second embodiment of the present invention.

In the second embodiment, illustrated in FIG. 3, the island 34 is permanently attached to the bulkhead 60. In this embodiment the island 34 remains in its fixed position at all times.

While the present invention has been described in what is presently considered to be its most practical and preferred embodiment or implementation, it is to be understood that the invention is not to be limited to the disclosed embodiment. On the contrary, the present invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A galley capable of storing and preparing food and constructed and arranged for onboard service in a passenger aircraft having a single deck, positioned at the rear of the aircraft comprising:
 a first plurality of cart storage compartments for storing mobile service carts wherein said storage compartments are arranged in a U-shaped configuration, wherein U-shaped designates a rounded lower portion connected to two upright extensions;
 a first countertop member that is U-shaped, said first plurality of cart storage compartments being positioned beneath said U-shaped first countertop member and being attached to said first countertop member;
 an island including a second plurality of cart storage compartments for storing mobile service carts and a second countertop member, said second countertop member covering said second plurality of storage carts and being attached to said second plurality of cart storage compartments, said island not being adjacent to any wall of said aircraft and being removably attached to the floor of the aircraft or to a bulkhead in the aircraft; and
 a generally U-shaped pathway defined between said U-shaped configuration of said first plurality of storage cart compartments and said island, wherein U-shaped designates a rounded lower portion connected to two upright extensions, the entirety of said galley comprising the U-shaped section of the storage cart compartments and countertops and island are located on a single level and being located on one floor of the single deck.

2. The galley of claim 1 further comprising a plurality of mobile service carts wherein each mobile service cart is stored within a cart storage compartment wherein there are the same number of cart storage compartments and mobile service carts.

3. The galley of claim 2 wherein said U-shaped configuration includes:
 a first set of cart storage compartments positioned adjacent to a first interior sidewall of the aircraft;
 a second set of cart storage compartments positioned adjacent to a second interior sidewall of the aircraft;
 a third set of cart storage compartments positioned adjacent to a back interior wall of the aircraft;
 a fourth set of cart storage compartments positioned on an angle between said first set of cart storage compartments and said third set of cart storage compartments; and
 a fifth set of cart storage compartments positioned on an angle between said second set of cart storage compartments and said third set of cart storage compartments.

4. The galley of claim 3, wherein said first and second set of cart storage compartments are positioned parallel to each other. storage compartments.

5. The galley of claim 3 wherein said island includes a sixth set of cart storage compartments positioned between said first set and said second set of cart storage compartments.

6. The galley of claim 5, wherein there are 14-18 storage compartments and carts within said U-shaped configuration and 2-4 storage compartments and carts within said island.

7. The galley of claim 5 wherein there are 14-18 storage compartments and carts within said U-shaped configuration.

8. The galley of claim 7 wherein there are 2-4 storage compartments and carts within said island.

9. A passenger aircraft having at least 190 passenger seats and comprising no more than three galleys of cart storage compartments according to claim 1.

10. The galley of claim 1 wherein said island of storage compartments is removably attached to the floor of the aircraft and can be moved to a different location at different times during the flight.

11. The galley of claim 1 wherein said mobile service carts stored within said storage compartments are removed by pulling them out into the aisle.

12. The galley of claim 1 wherein there are multiple service carts positioned in a storage compartment.

13. A passenger aircraft comprising:
 a passenger cabin with a single level;
 a galley positioned at a rear of the passenger cabin;
 a first plurality of cart storage compartments in the galley for storing a plurality of mobile service carts, wherein the first plurality of cart storage compartments are arranged in a substantially U-shaped configuration, and wherein U-shaped designates a rounded lower portion connected to two upright extensions;
 a first countertop member in the galley that is substantially U-shaped;
 an island in the galley comprising a second plurality of cart storage compartments for storing the plurality of mobile service carts and a second countertop member; and
 a substantially U-shaped pathway in the galley defined between the substantially U-shaped configuration of the first plurality of storage cart compartments and the island, wherein U-shaped designates a rounded portion connected to two upright extensions.

14. The passenger aircraft of claim 13 wherein the galley is capable of storing and preparing food and constructed and arranged for onboard service in the passenger cabin.

15. The passenger aircraft of claim 13 wherein the first plurality of cart storage compartments are positioned beneath the first countertop member and are attached to the first countertop member.

16. The passenger aircraft of claim 13 wherein the second countertop member covers the second plurality of cart storage compartments.

17. The passenger aircraft of claim 13 wherein the second countertop member is attached to the second plurality of cart storage compartments.

18. The passenger aircraft of claim 13 wherein the island is not adjacent to any wall of the aircraft.

19. The passenger aircraft of claim 13 wherein the island is removably attached to one of the items selected from the group consisting of the floor of the aircraft and a bulkhead in the aircraft.

20. The passenger aircraft of claim 13 wherein the island is removably attached to the floor of the aircraft and capable of being moved to a different location at different times during the flight.

21. The passenger aircraft of claim 13 wherein the plurality of mobile service carts stored within the first plurality of storage compartments are removed by pulling the plurality of mobile service carts into the aisle.

22. The passenger aircraft of claim 13 wherein there are multiple service carts positioned in a cart storage compartment.

23. The passenger aircraft of claim 13 wherein each of the plurality of mobile service carts is stored within one of the first plurality of cart storage compartments, and wherein the number of the first plurality of cart storage compartments is the same as the number of plurality of mobile service carts.

24. The passenger aircraft of claim 23 wherein the U-shaped configuration further comprises:
    a first set of cart storage compartments positioned adjacent to a first interior sidewall of the aircraft;
    a second set of cart storage compartments positioned adjacent to a second interior sidewall of the aircraft;
    a third set of cart storage compartments positioned adjacent to a back interior wall of the aircraft;
    a fourth set of cart storage compartments positioned on an angle between the first set of cart storage compartments and the third set of cart storage compartments; and
    a fifth set of cart storage compartments positioned on an angle between the second set of cart storage compartments and the third set of cart storage compartments.

25. The passenger aircraft of claim 24, wherein the first set of storage compartments and the second set of cart storage compartments are positioned parallel to each other.

26. A passenger aircraft comprising:
    a passenger cabin;
    a plurality of passenger seats on a floor of the passenger cabin;
    a galley positioned at the rear of the passenger cabin, wherein the galley is on the floor of the passenger cabin;
    a first plurality of cart storage compartments in the galley for storing a plurality of mobile service carts, wherein the first plurality of cart storage compartments are arranged in a substantially U-shaped configuration, and wherein U-shaped designates a rounded lower portion connected to two upright extensions;
    a first countertop member in the galley that is substantially U-shaped;
    an island in the galley comprising a second plurality of cart storage compartments for storing the plurality of mobile service carts and a second countertop member; and
    a substantially U-shaped pathway in the galley defined between the substantially U-shaped configuration of the first plurality of storage cart compartments and the island, wherein U-shaped designates a rounded lower portion connected to two upright extensions.

* * * * *